W. F. CODRINGTON.
METHOD OF AND APPARATUS FOR PRODUCING ROLLS OF ADHESIVE MATERIAL.
APPLICATION FILED APR. 24, 1914.
1,204,248.
Patented Nov. 7, 1916.
9 SHEETS—SHEET 1.
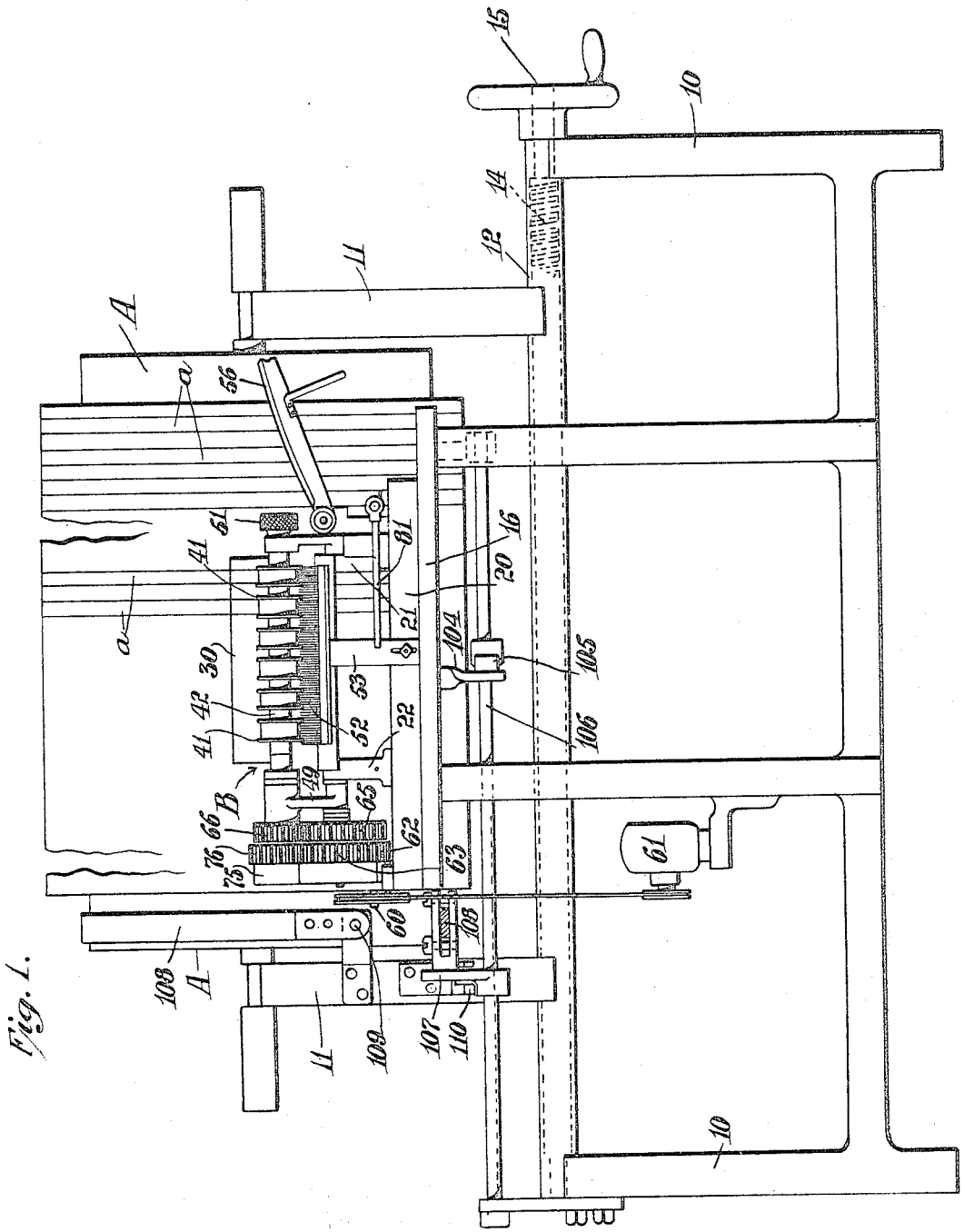
Attest:
Inventor:
William F. Codrington
by Arthur L. Kent
his Atty

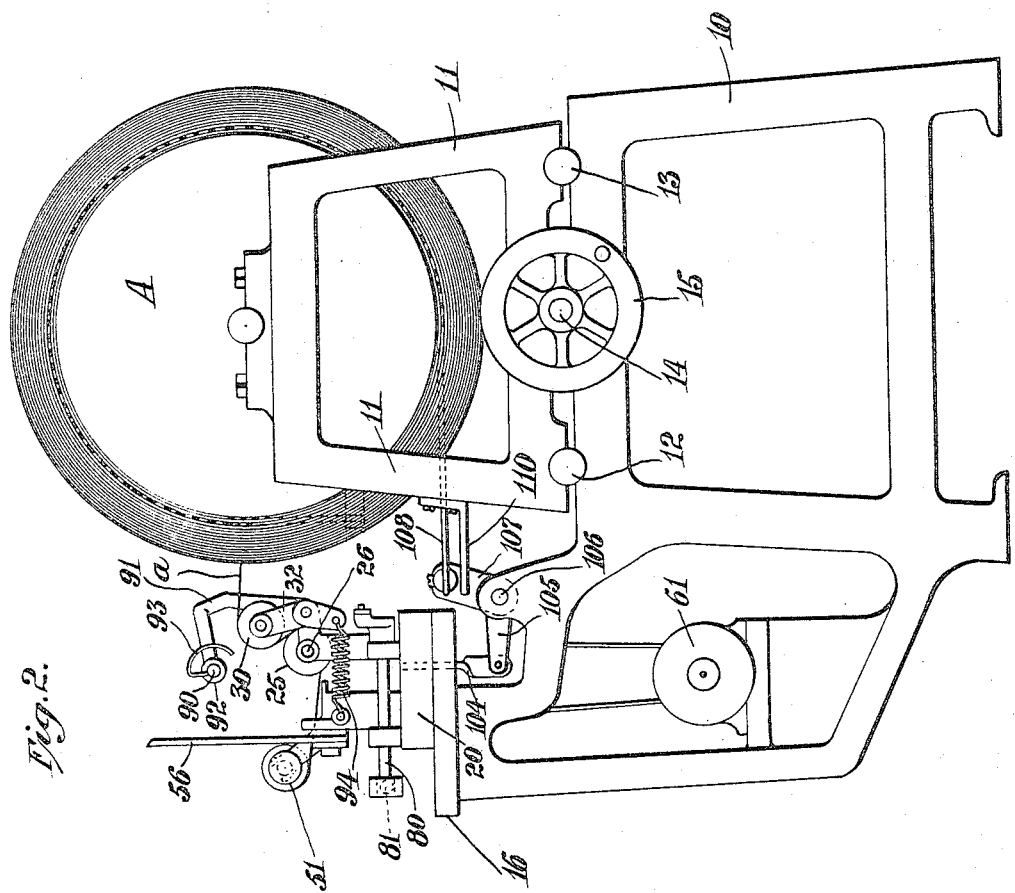

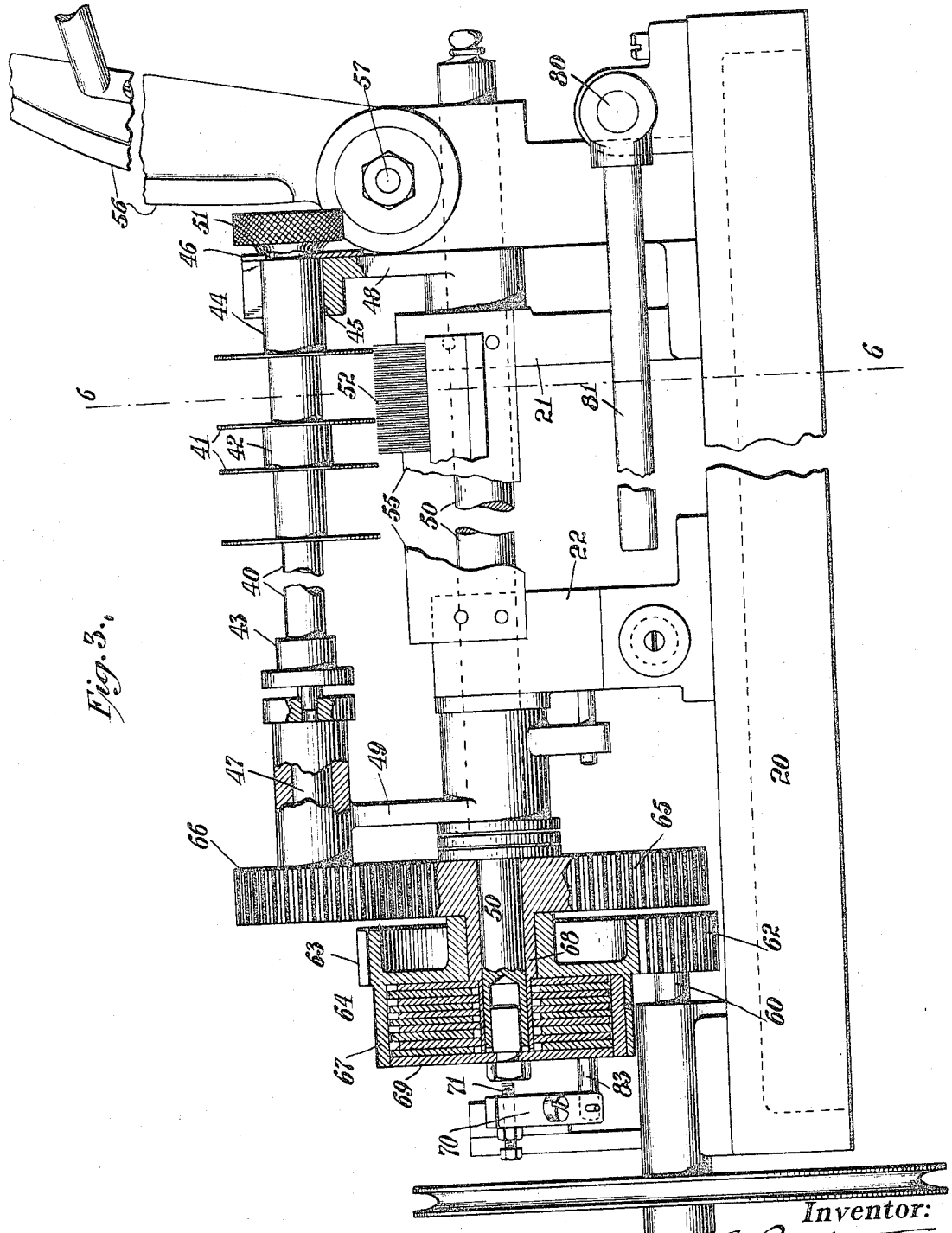

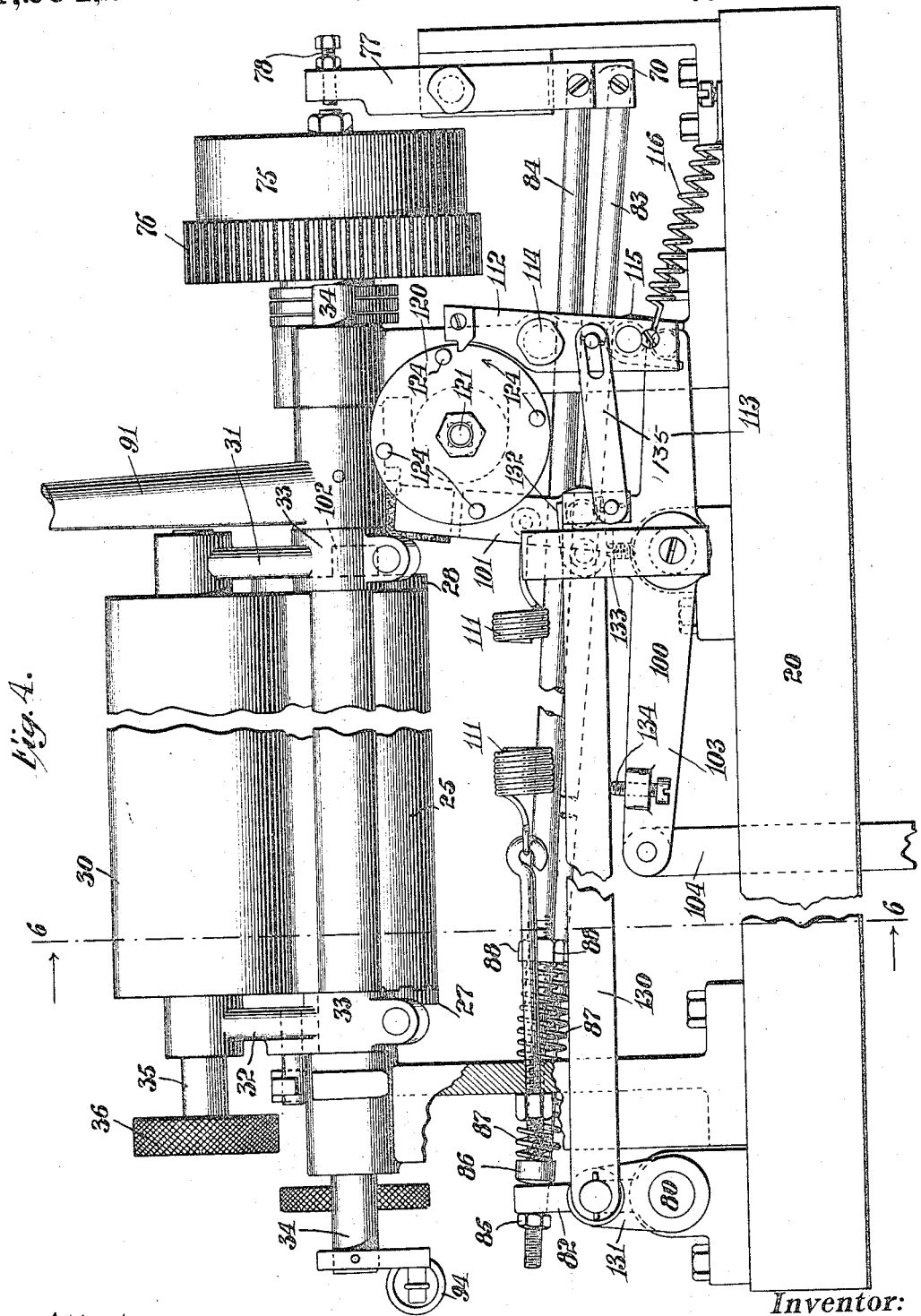

W. F. CODRINGTON.
METHOD OF AND APPARATUS FOR PRODUCING ROLLS OF ADHESIVE MATERIAL.
APPLICATION FILED APR. 24, 1914.
1,204,248.
Patented Nov. 7, 1916.
9 SHEETS—SHEET 5.
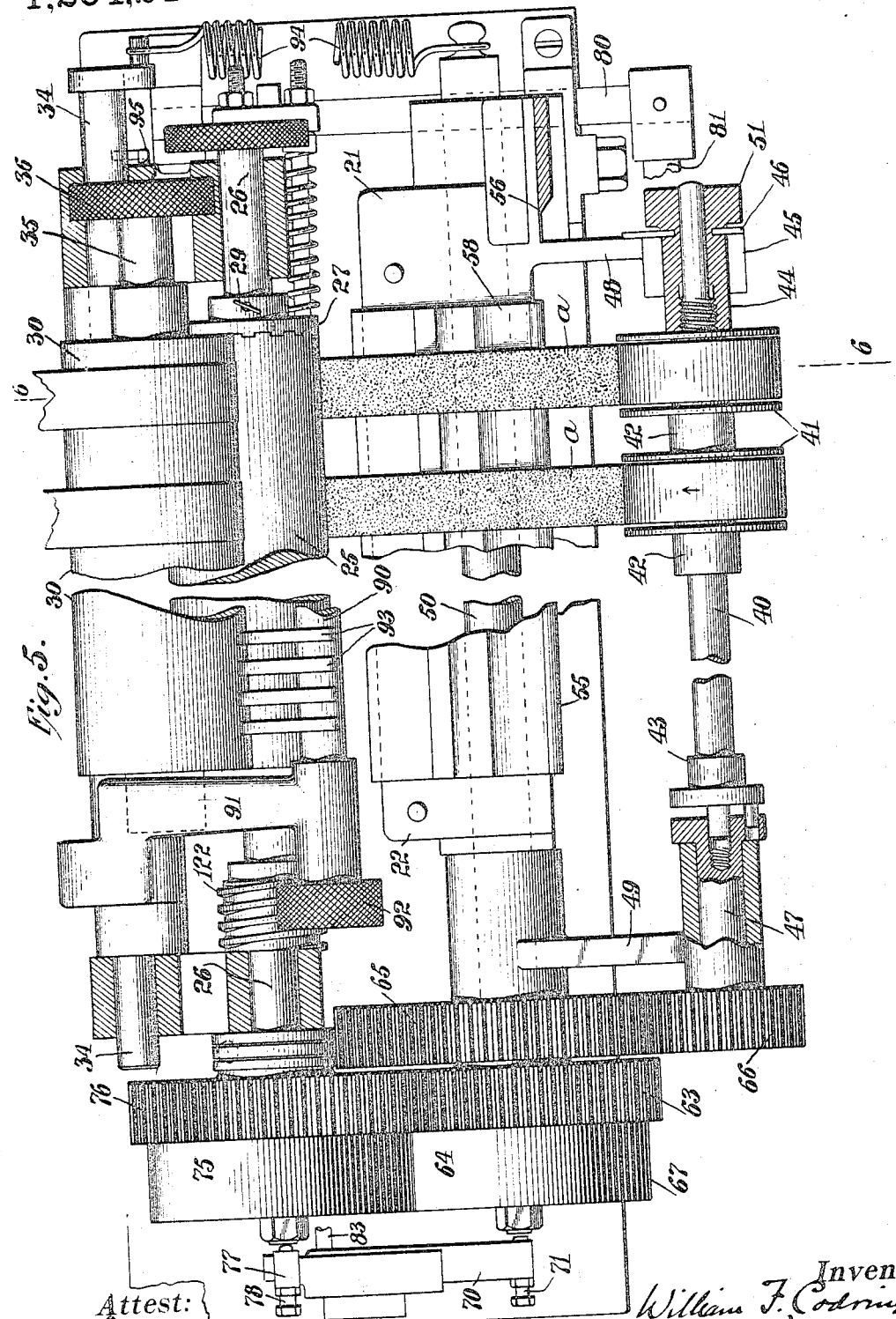
Attest:
C. B. Mitchell
Lillian R. Fot.
Inventor:
William F. Codrington
by Arthur L. Kent
his Atty

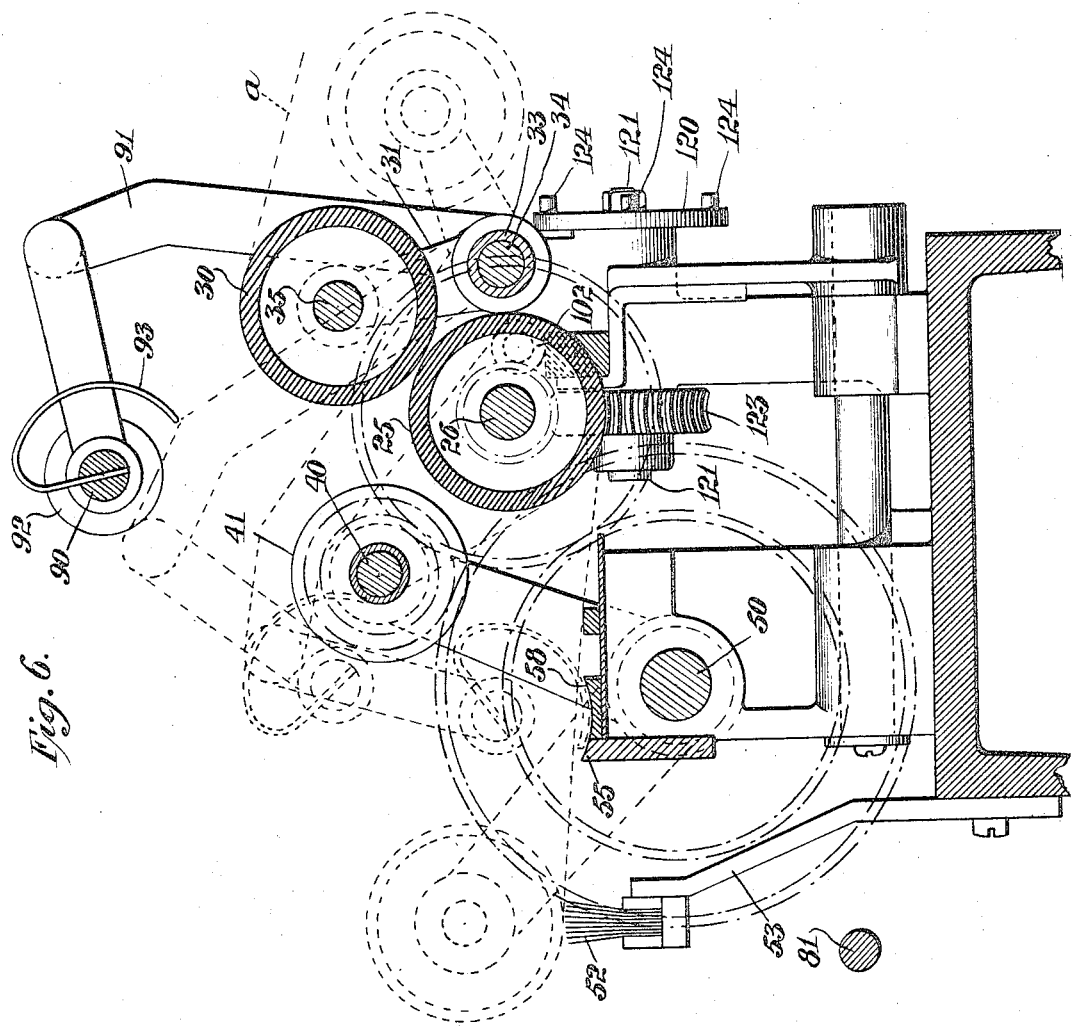

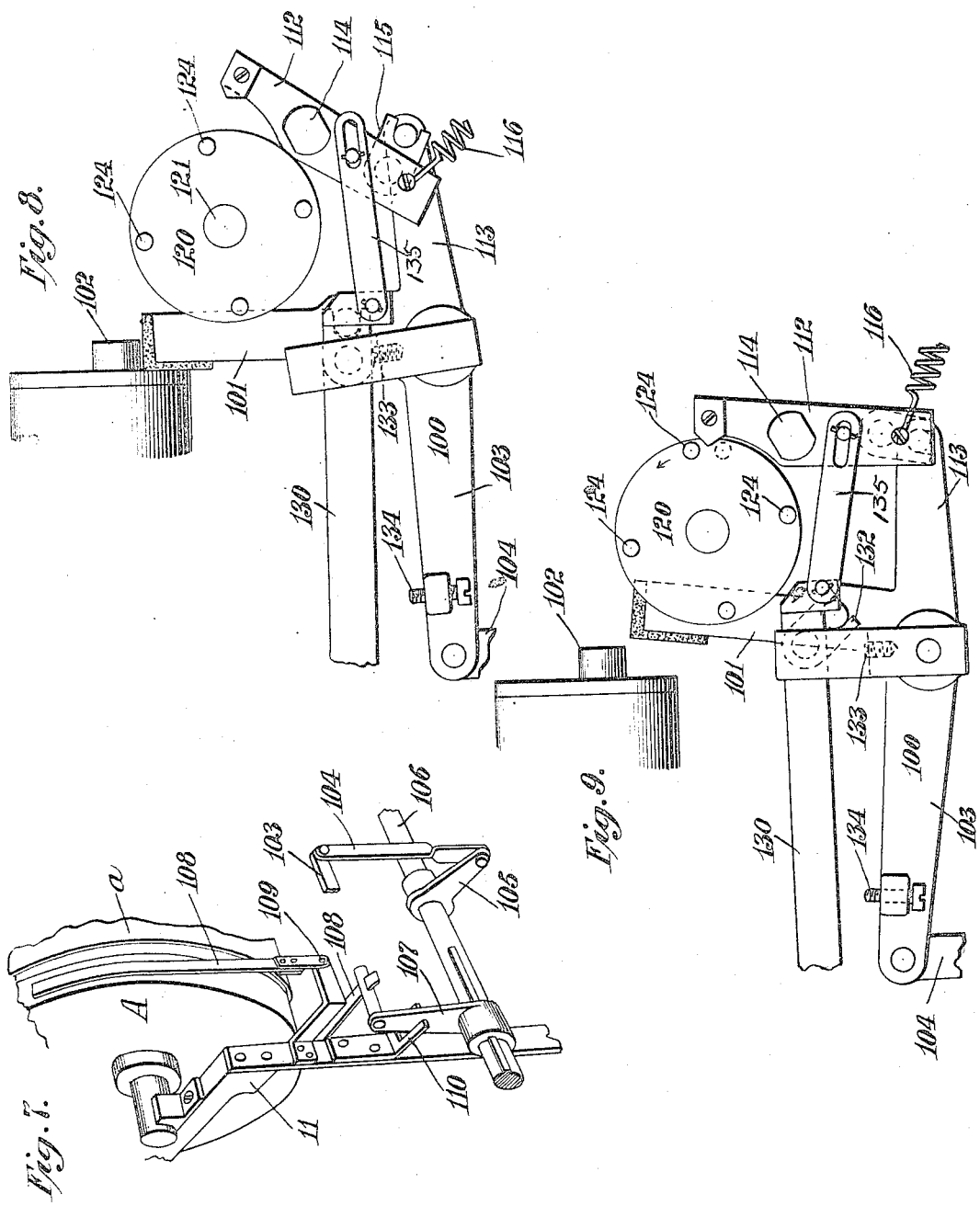

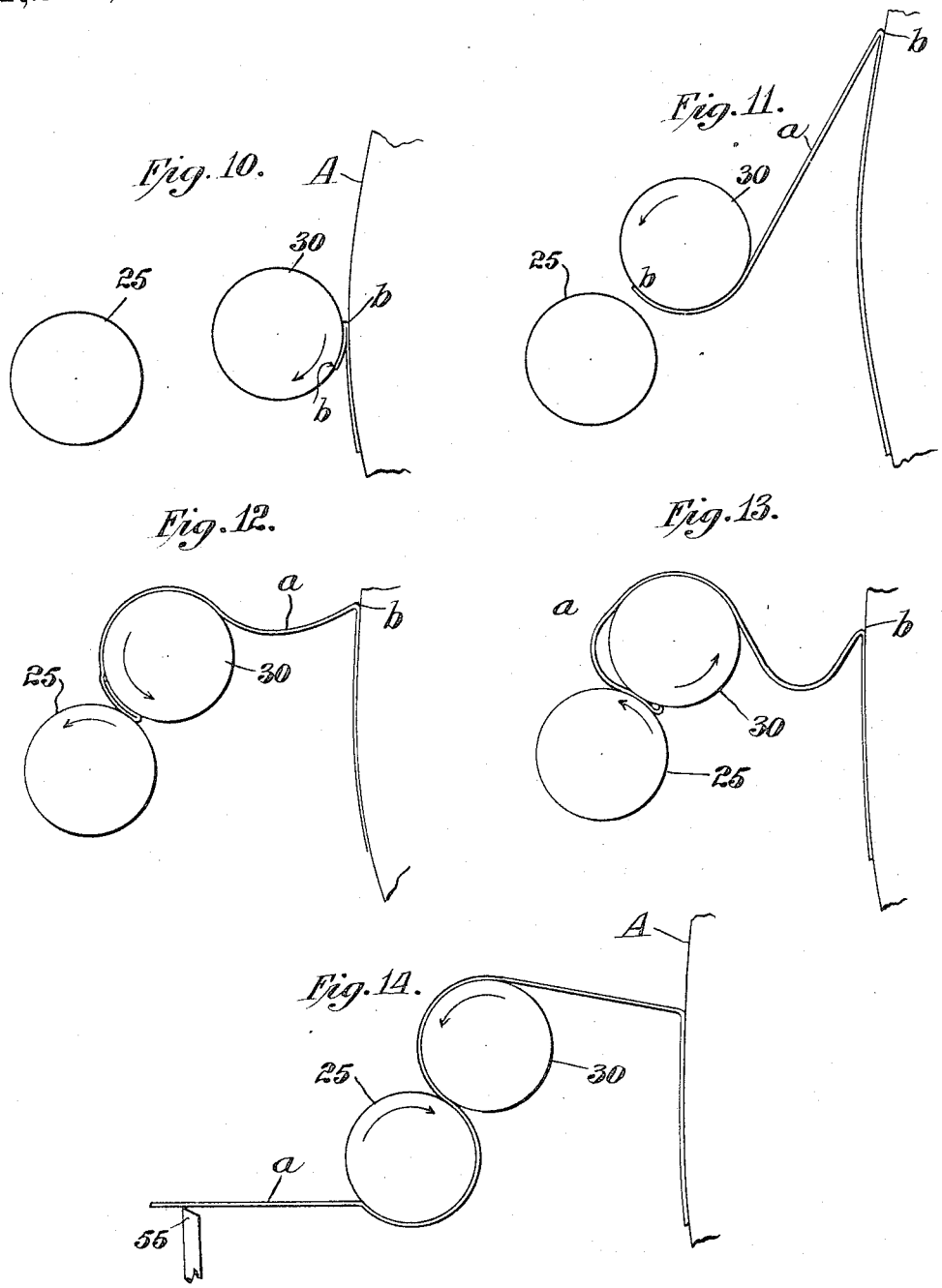

W. F. CODRINGTON.
METHOD OF AND APPARATUS FOR PRODUCING ROLLS OF ADHESIVE MATERIAL.
APPLICATION FILED APR. 24, 1914.
1,204,248.
Patented Nov. 7, 1916.
9 SHEETS—SHEET 9.
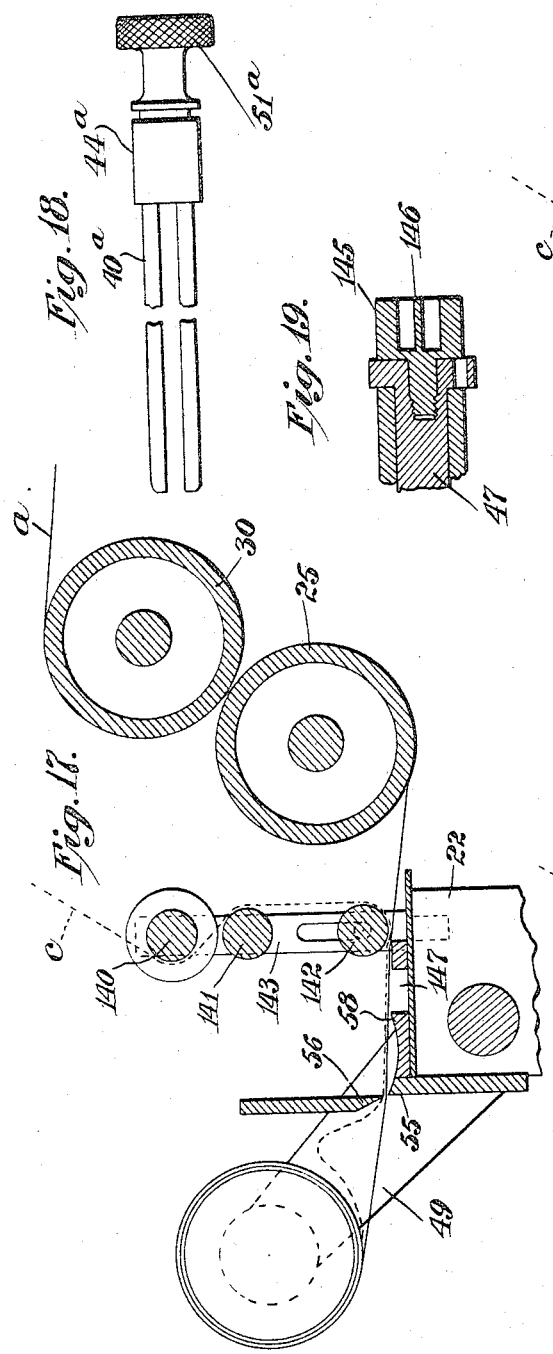
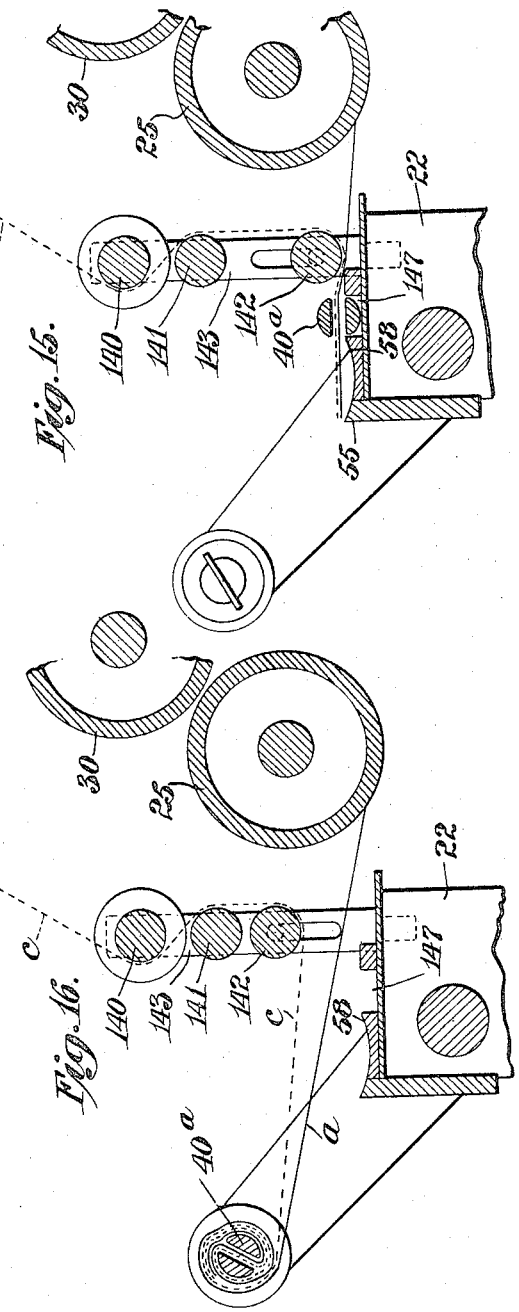
Attest:
Inventor:
by William F. Codrington
Arthur L. Kent his Atty

UNITED STATES PATENT OFFICE.

WILLIAM F. CODRINGTON, OF NEW YORK, N. Y.

METHOD OF AND APPARATUS FOR PRODUCING ROLLS OF ADHESIVE MATERIAL.

1,204,248.

Specification of Letters Patent.

Patented Nov. 7, 1916.

Application filed April 24, 1914. Serial No. 834,050.

*To all whom it may concern:*

Be it known that I, WILLIAM F. CODRINGTON, a citizen of the United States, residing at New York city, in the county of New York and State of New York, have invented certain new and useful Improvements in Methods of and Apparatus for Producing Rolls of Adhesive Material, fully described and represented in the following specification and the accompanying drawings, forming a part of the same.

This invention relates to the production of rolls of adhesive tape, and comprises a method whereby such rolls are produced and apparatus for use in carrying out such method and producing such rolls.

In the manufacture of adhesive plaster which is commonly sold in the form of strips or tapes of various widths wound into small rolls either on flanged spools, or otherwise, it is the practice to produce such plaster by coating, usually on only one side, a comparatively wide web of cloth or other suitable fabric; to wind such coated web on a drum of comparatively large diameter, the coated web being usually of a length many times greater than the length of the strips or tapes in the rolls as sold; to cut the materials so wound on the drum circumferentially into strips or tapes in the desired width; and then strip the tapes thus formed from the drum in desired lengths and to wind the same into rolls to form the desired product, either with or without a strip of uncoated cloth or other suitable material wound with the tape to lie between the successive layers of the tape and to adhere to its coated side and form a protective covering therefor when the tape is subsequently unwound.

The present invention has been made with the object of providing an improved method and apparatus for drawing from such a supply drum either one such tape at a time or a plurality of such tapes simultaneously and winding the same into the desired small rolls of a predetermined length of tape; and the invention aims to provide for the rewinding of such tape or the production of rolls thereof rapidly and in such manner that the tape shall be wound under a desired and readily controlled tension.

Other objects and advantages of the invention will appear hereinafter.

A full understanding of the invention can best be given by a detailed description of a winding machine which I now consider to best embody this apparatus feature of the invention and to be best adapted for carrying out my method, and of the operation of such machine, in connection with drawings illustrating such a machine, and such a description will now be given.

The accompanying drawings illustrate such an approved form of winding machine adapted for carrying out my improved method and embodying the apparatus features of the invention.

In said drawings, Figure 1 shows the complete machine in front elevation, parts of the winding mechanism being omitted for clearness; Fig. 2 is an end view looking from the right in Fig. 1; Fig. 3 is an enlarged front view of the winding mechanism partly in elevation and partly in section with parts broken away and parts omitted for the sake of clearness; Fig. 4 is a rear elevation of the winding mechanism with the middle portion of the mechanism broken away and parts omitted for the sake of clearness; Fig. 5 is a plan view of the winding mechanism with the middle portion of the mechanism broken away and parts omitted for clearness; Fig. 6 is a sectional view taken on lines 6—6 of Figs. 3, 4 and 5; Fig. 7 is a broken detail view showing in perspective parts of the supply drum, brake and operating connections; Fig. 8 is a detail view of the three-armed stop lever and connecting parts looking from the rear of the winding mechanism but showing the parts in a different position from that in which they are shown in Fig. 4; Fig. 9 is a view similar to Fig. 8 but showing the parts in another position; Figs. 10, 11, 12, 13 and 14 are diagrammatic views illustrating a way of threading through the machine the ends of tapes to be wound; Fig. 15 is a fragmentary view in section illustrating the winding of rolls of tape with strips of covering material wound with the tapes and showing attachments with which the machine may be provided for this purpose; Figs. 16 and 17 are similar views further illustrating the winding of rolls of tape with strips of covering material wound with the tapes and showing attachments with which the machine may be provided for this purpose; Fig. 18 is a broken view of a form of spindle used in winding covering strips with the tapes; Fig. 19 is a detail sectional view showing means for connecting the end of the spindle shown in Fig. 18 to the spindle-driving shaft 47.

Referring to the drawings, the machine shown comprises means for supporting and for controlling the rotation of a supply drum A, and a winding mechanism B. The supply drum support and the winding mechanism are mounted on a main frame 10 in such a way as to permit of relative adjustment between the supply drum and the winding mechanism longitudinally of the axis of the drum. To provide for such adjustment in the machine shown, the supply drum is supported in bearings carried by a supporting frame or carriage 11 which is mounted to slide on rods 12 and 13; and for adjusting the position of the carriage to bring the drum into the desired position relatively to the winding mechanism, an adjusting screw 14 is provided having a hand wheel 15 or other turning means. As hereinbefore explained, the adhesive fabric, for winding tapes of which the present machine is designed, is commonly produced in a comparatively wide web or sheet which is wound on a supply drum and then cut circumferentially to form tapes or strips of the desired width, usually from one-half to two or more inches wide. The usual width of the web of cloth or other fabric thus coated and wound on the drum is thirty-six inches, and the present machine has been built to accommodate supply drums carrying fabric of this width, although it will be understood, of course, that shorter drums or drums carrying tapes aggregating in width less than the maximum width might be used in the machine, or that the machine might be built for drums of greater or less dimensions. The winding mechanism is for practical reasons most advantageously made of a size to have a capacity for winding at one time tapes from only a part of the longitudinal extent of the supply drum, the length of the receiving portion of the winding spindle in the machine as built being twelve inches; and the tapes are taken first from one portion of the supply drum and then the supply drum is shifted to change the relative position of the drum and the winding mechanism and the tapes are taken from a new portion of the drum. It is also desirable, as will hereinafter appear, to wind at one time alternate tapes from the supply drum and then after shifting the drum to wind other alternate tapes from the same portion of the drum.

The winding mechanism in the machine shown is mounted in front of the supply drum on a table 16. The mechanism as shown comprises a feeding cylinder or roll by which the tapes a are drawn from the supply roll by engagement of the adhesive side of the tapes with the surface of the cylinder, a winding spindle by which the tapes are stripped from the feed roll and wound into rolls, a roll over which the tapes pass from the supply drum to the feed roll and which is movable bodily for the purpose of threading the tapes through the winding mechanism, automatic stop mechanism whereby the feeding of the tapes is stopped when a predetermined length thereof has been wound on the spindle, severing means whereby the wound portions of the tapes are cut off, means for controlling the tension under which the tapes are wound on the spindle, and other features and parts. The various operative parts of the winding mechanism are mounted in a suitable frame comprising as shown a bed 20 and end supports including uprights 21 and 22. The feeding cylinder or roll 25, which also serves as a measuring cylinder, is mounted free to rotate on a shaft 26 between collars 27 and 28 which turn with the shaft, the collar 27 being mounted to slide on the shaft and having its engaging face formed to interlock with the suitably formed end of the cylinder or roll 25, for example, as shown in Fig. 5, so that when the collar is set up against the end of the cylinder the cylinder will be caused to rotate with the shaft, and when the collar is moved away from the end of the cylinder the cylinder may be adjusted angularly on the shaft for the purpose hereinafter pointed out. A set screw, as indicated at 29, serves to lock the collar in operative position against the end of the cylinder. This cylinder should have a surface of such character that the tapes will adhere thereto sufficiently to secure the required pull on the tapes for stripping them from the supply drum and yet to permit them to be stripped from the feed cylinder by the winding spindle without requiring too great tension and without the accumulation of adhesive material on the surface of the cylinder, and with these objects in view I find it most advantageous to make the cylinder of cast iron with a surface which is machined but not polished. The circumference of the cylinder is best such that the lengths of tape desired to be wound on the spindle will be even multiples of this circumference.

Mounted between the feeding roll and the supply drum, is a cylinder roll 30 which in the winding operation of the mechanism serves as a guide roll over which the tapes pass from the supply drum to the feeding roll. This cylinder also has a surface to which the adhesive side of the tapes will suitably adhere when the cylinder is serving a function which it has in threading the tapes through the winding mechanism as hereinafter described, and for this purpose it may also be made of cast iron with a machined but not polished surface. In order that this roll may serve its function in threading the tapes through the winding mechanism, it is carried by arms 31 and 32 which extend upward from a sleeve 33 mounted to turn on a supporting shaft 34. The arms are fast to the sleeve so as to move together and the roll 30 is fast on its shaft 35 which is journaled in bearings carried by the arms 31 and 32 and is provided at one end with means whereby the shaft may be turned by hand, such as the disk 36 as shown.

The winding spindle 40 in the machine shown is a removable spindle which may be removed from the machine as for having flanged or other spools or cores placed thereon for receiving the rolls of tape and for removing the wound rolls from the spindle. The drawings show the spindle as provided with such flanged spools, Figs. 3 and 5 showing for clearness of illustration, however, only two such spools on the spindle. The spools 41, which are customarily of sheet metal, are placed on the spindle spaced by means of spacing collars 42, and when the proper number of spools and collars have been placed on the spindle they are forced together and against a shoulder 43 at one end of the spindle by means of a nut 44 which screws on to the other end of the spindle. The nut 44 is formed to rest in an open bearing 45 and the spindle is positioned against endwise movement by a plate 46 the edge of which enters a circumferential groove in the nut. The other end of the spindle is formed to connect with and to be supported from and rotated by a short shaft 47, the ends of the shaft and of the spindle being formed one with a centering pin and a driving pin, and the other with corresponding recesses for receiving such pins, as clearly shown in Fig. 5. The bearing 45 for the end of the spindle which carries the nut 44 and the bearings for the spindle driving shaft 47 are carried by arms 48 and 49 respectively which are fast on a shaft 50 mounted in the uprights 21 and 22 forward of and somewhat below the feeding and measuring roll 25, this to permit the spindle to be shifted back and forth about the axis of the shaft 50 between the upper position shown by full lines in Fig. 6 to the forward position shown in Figs. 3 and 5 and by dotted lines in Fig. 6; suitable stops being provided for limiting the movement of the carrying arms in either direction. The spindle nut 44 is conveniently provided with a finger disk 51. For having the ends of the tapes to be wound brought up against and caused to adhere to the cores of the spools on the spindle, the spindle carrying arms are thrown up and back to position the spindle as shown by full lines in Fig. 6, and the spindle most desirably stands in this position during the winding operation. After the desired length of tape has been wound on the spools, the spindle is moved forward and downward to the position shown in Figs. 3 and 5 and by dotted lines in Fig. 6, and the portions of the tapes between the spindle and the feed roll are thereby brought into position over a stationary cutting blade or knife edge 55 with which a movable cutting blade 56 coöperates to sever the tapes, and the rolls of tape wound on the spindle are brought into contact with a brush 52. The movable cutting blade is pivotally mounted at 57 to swing down to coöperate with the stationary blade 55 to sever the tapes with a shearing cut and when not in use is thrown up and back out of the way. After the tapes have been severed, the ends extending from the feed roll rest on a support or table 58 adjacent and to the rear of the knife 55. The loose ends of the tapes extending from the wound rolls on the spindle may then be applied to the rolls by turning the spindle by hand in the winding direction, the brush 52 pressing the ends of the tapes against the rolls as the latter turn. The brush is carried by an adjustable bracket 53.

The feeding and measuring roll and the spindle shaft are driven from a driving shaft 60 which may be driven from any suitable source of power or it might be by hand. As shown, the shaft 60 receives its motion from an electric motor 61 through a belt. It is desirable that the feed roll shall be driven during the winding operation at an approximately even or uniform speed except at the start as explained below; and that the winding spindle shall be driven with gradually decreasing speed as required to compensate for the gradually increasing size of the rolls on the spindle and to take up the tapes as stripped at a uniform speed from the feeding roll. Such differential movement of the feeding roll and the winding spindle, or gradually decreasing speed of the winding spindle with relation to the speed of the feeding roll, whether the speed of the feeding roll be uniform or otherwise, is secured in the machine shown by driving the spindle by means of a slip clutch. It is also desirable that the feeding roll shall be driven through a slip clutch in order that the starting of the feeding roll and of the supply drum, which is rotated through the pull of the feeding roll on the tapes, shall be somewhat gradual in order to avoid excessive strain on the tapes at starting, and also to reduce the required maximum speed of the spindle as hereinafter explained. As shown, the driving shaft 60 carries a pinion 62 which drives a gear 63 which carries the driving member of a friction clutch 64, the driven member of which turns a large gear 65 with which a small gear 66 on the spindle shaft 47 meshes. The clutch 64, which might be of any suitable style, is as shown a disk clutch having a plurality of driving disks mounted within and turning with a cup 67 extending from the gear 63 and a plurality of driven disks alternating with the driving disks and mounted free to move axially on but to turn with a sleeve 68 which forms the driven member of the clutch. The sleeve 68 and gear 65 are formed integral or otherwise connected to turn together and are mounted on the shaft 50, and the gear 63 is journaled on the sleeve 68. The clutch plates are pressed together to cause the sleeve 68 and gear 65 to be driven by the rotation of the gear 63 by means of a plate 69 which is positioned by a stud extending into a central bore at the end of the shaft 50, and which plate is forced up to duty by means of a lever 70 which carries an adjustable bearing pin 71 the end of which bears on a boss on the plate.

The feed roll is driven through a similar clutch 75 mounted on the end of the feed roll shaft 26, the driving member of which is carried by a gear 76 which meshes with the gear 63, and the clutch is operated to cause the shaft 26 and feed roll to rotate by means of a lever 77 having an adjustable bearing pin 78.

The clutch levers are controlled by a rock shaft 80 mounted at the opposite end of the machine from the clutches and which is rocked by means of a hand control lever 81 extending across the front of the machine. The rock shaft 80 carries an upwardly extending arm 82 which is formed with two openings to receive the ends of two connecting rods 83 and 84 respectively, which rods extend lengthwise of the machine to connect at the opposite end of the machine with the clutch levers 70 and 77, the rod 83 being connected with the lower end of the lever 70 and the rod 84 with the lower end of the lever 77, the levers being pivotally supported each at a point intermediate its bearing point and the point of its connection with the connecting rod. Each of the rods 83 and 84 is provided with an adjustable shoulder formed by a nut 85 screwed on to the threaded end of the rod for engaging the outer side of the arm 82 and with a spring-pressed collar 86 which is free to slide on the rod and which is pressed into engagement with the inner side of the arm 82 by a spring 87, the compression of which is adjustable as by means of a screw nut 88 on the rod. When the control lever 81 is depressed to rock the shaft 80 to throw the arm 82 inward, therefore, the rods 83 and 84 will be moved to the right in Fig. 4 to operate the clutch levers and cause the clutches to come into operation and the spindle and feeding roll to be driven, and the power applied to the clutches will be exerted through the springs 87 and the relative pressures exerted on the disks of the two clutches will depend upon the relative adjustment of these springs. For convenience, I provide means for adjusting the spring on both of the rods 83 and 84, but, obviously, to provide for relative adjustment of these springs and thereby of the pressures exerted on the clutch disks, it is only necessary that the spring on one of the rods shall be adjustable, as, for example, the spring on the rod 84 for operating the feed roll clutch might be fixed and an adjusting nut provided only for adjusting the spring on the rod 83.

For lifting the ends of the tapes from the table 58 and applying the same to the cores of the spools, there is provided a pick-up bar 90 carried by a swinging arm 91 mounted fast on the shaft 34 and extending upward therefrom at the left hand end of the machine beyond the ends of the rolls 25 and 30. The pick-up bar is mounted to turn in a bearing in the end of the arm 91 in which it may be turned by means of a finger disk 92 and it is provided with pick-up means formed best by a series of spring pick-up fingers 93, the outer portions of which extend concentrically with and part way around the bar. When the bar is swung downward and turned to bring the pick-up fingers into the position shown in the lowermost position of the bar as indicated by dotted lines in Fig. 6, the ends of the fingers will be pressed into engagement with the adhesive side of the ends of the tapes resting on the table 58. The table should be slightly concave as shown in Fig. 6 to conform to the bend of the pick-up fingers so that the tapes will be caused to adhere firmly to the fingers. The pick-up bar being then lifted, the spindle being in the position shown by full lines in Fig. 6, the tapes may be brought into contact with the cores of the spools on the spindle, and by turning the pick-up bar in the intermediate position indicated by dotted lines in Fig. 6, the tapes may be stripped from the pick-up fingers and wiped against the cores of the spools and so attached thereto, the spring fingers yielding as their ends pass against the cores of the spools and then springing slightly outward again so as to press the ends of the tapes about the cores. The pick-up bar is then moved farther up and back to the position shown by full lines in Fig. 6 where it rests during the winding operation. The pick-up fingers should be of a width not greater than the narrowest tape the machine is intended to roll and when the machine is to be used for winding the tapes on flanged spools are so spaced and positioned lengthwise of the bar as to come between the flanges of the spools on the spindle. Pick-up fingers positioned for picking up from the table 58 alternate tapes of the narrowest width from the supply drum and for entering between the flanges of spools positioned on the spindle for winding such narrow tapes, will also serve for picking up tapes of a width which is a multiple of the width of the narrowest tapes and which are spaced apart a distance equal to their width and will clear the flanges of spools positioned on the spindle for winding such wider tapes. For holding the arm 91 and the pick-up bar in the position shown by full lines in Fig. 6, and for counterbalancing more or less the weight of the bar and arm when moved forward and downward, a spring 94 is connected with a stud extending from an arm on the end of the shaft 34, a suitable stop as indicated at 95 in Fig. 5 being provided for limiting the backward movement of the arm.

In order that the rolls of tape wound on the spindle shall contain a desired length of tape, I provide automatically acting stop mechanism whereby after the feeding and measuring cylinder has made a predetermined number of revolutions the operation of the winding mechanism is stopped. Such stop mechanism in the apparatus shown comprises means for positively stopping the rotation of the feeding and measuring cylinder, and means for braking the supply drum. Pivotally mounted at the rear side of the machine is a three-armed stop lever 100, one arm 101 of which extends upward in position to move into the path of a stop pin 102, shown in Figs. 8 and 9 and in dotted lines in Fig. 4, extending from the outer face of the disk 28 and which therefore revolves with the feeding and measuring cylinder. Another arm 103 of the lever, which extends horizontally, connects through a link 104 with an arm 105 carried by a rock shaft 106 which extends parallel with the axis and direction of longitudinal adjustment of the supply drum. Mounted to slide on this rock shaft and keyed thereto to turn therewith is an arm 107 to which is connected one end of a brake band 108 which circles the end of the drum and has its other end secured at the point 109. When the stop lever 100 is thrown to move its arm 103 downward, the shaft 106 is rocked to move the arm 107 in the direction to tighten the brake band on the drum. The arm 107 moves in a slotted guide 110 which projects from the drum carriage 11 and serves to move the arm 107 on the shaft 106 to cause it to follow the longitudinal movements of adjustment of the drum.

The stop lever is rocked to carry its stop arm into operative position and to lighten the brake band on the supply drum by means of a strong spring 111, and when the machine is to start is moved in the opposite direction against the tension of this spring to release the feeding cylinder and to loosen the brake band, and is held in such running position against the tension of the spring, by means of a locking lever 112 which is automatically tripped to release the stop lever after a predetermined number of revolutions of the feeding cylinder. The locking lever 112 coöperates with a third arm 113 of the stop lever and is pivotally mounted at a point 114 intermediate its ends to stand when in locking position transversely to the arm 113. The connection between the locking lever and the arm 113 is by means of a short link 115. When the stop lever is swung into running position, the locking lever swings under tension of a spring 116 into locking position, as shown in Figs. 4 and 9, throwing the link 115 into position to hold the stop lever against return movement by preventing upward movement of the arm 113. When the locking lever is moved in the opposite direction against the tension of its spring, the link is swung out of its holding position, releasing the stop lever and allowing it to rock under the pull of the spring 111 back to its stop or operative position, the locking lever and the link 115 then taking the position shown in Fig. 8.

The locking lever 112 is automatically tripped after the desired operation of the winding mechanism through the medium of a measuring disk 120 carried by a shaft 121 which is given a slow rotation during the winding operation by means of a worm 122 on the feed cylinder shaft which drives a worm wheel 123 on the shaft 121. The measuring disk carries one or more projecting studs 124 adapted to engage the suitably shaped upper end of the locking lever 112 and to force the end of the lever outward to release the stop lever as above explained. The measuring disk should be provided with a single stud, or with two or more equally spaced studs, according to the ratio between the speed of rotation of the disk and of the feeding cylinder and according to the length of tape to be wound or the number of complete turns the feeding cylinder is to make at each winding operation. To provide for changing the length of tape wound at each operation, the measuring disk is detachably mounted on the shaft 121 and a number of disks according to the number of different lengths of tape to be wound are provided each having the number of equally spaced studs required for tripping the locking lever after the required number of revolutions of the feeding and measuring cylinder. If, for example, a disk having four studs, as shown in the drawings, serves to stop the feeding and winding of the tapes after tapes five yards long have been wound, then a disk with two studs positioned at diametrically opposite points would serve for winding rolls of ten yards length, and a disk having a single stud would serve for winding rolls of twenty yards of tape.

In the apparatus shown I have for convenience in controlling the operation of the winding mechanism provided for operating the stop lever and for controlling the driving clutches by a single control lever. For this purpose, the shaft 80 which is rocked by the control lever 81 is connected with the stop lever through a link 130 which is connected at one end with an arm 131 fast on the shaft 80 and at the other end is connected with the upwardly extending arm 101 of the stop lever through a short tripping link 132. When the winding mechanism is at rest with the stop lever in the position shown in Fig. 8 and the control lever lifted to its off position, the link 132 will stand lengthwise of the link 130 or in position to transmit endwise movement of the link to the stop lever, a suitable stop, as the adjustable stop 133 shown by dotted lines in Figs. 4, 8 and 9, being provided to limit the downward movement of the connecting ends of the links 130 and 132 to hold them in this relative operating position. When the control lever is moved downward, the link 130 acting on the arm 101 of the stop lever through the tripping link 132 throws the stop lever to its running position shown in Fig. 4, in which position it is then locked by means of the locking lever 112 as before explained, the parts of the controlling mechanism being then in the position shown in Fig. 4 in which the machine is ready to start but with the clutches not yet in operation. Slight further downward movement of the control lever will then first cause a slight further rocking of the stop lever by which through engagement of an adjustable stop 134 on the arm 103 of the stop lever with the link 130 the end of the link connected with the tripping link 132 will be lifted to turn the tripping link out of line with the link 130 thereby disconnecting the link 130 from the stop lever so that it may then be moved to the position shown in Fig. 9 without causing further movement of the stop lever and leaving the stop lever free to return to its stop position under the action of its spring 111 when the locking lever 112 is tripped. After the operative connection between the rock shaft 80 and the stop lever is thus broken, further downward movement of the control lever will result in throwing the clutches 64 and 75 in operation to drive the winding spindle and feeding and measuring cylinder. It will be noted that when the stop lever has been moved to its running position and then by slight further movement of the control lever the operative connection between the stop lever and the rock shaft 80 has been broken, the rock shaft is also thereby disconnected from the stop lever spring 111 so that in its further movement the control lever will be free from the pull of this spring. When the locking lever 112 is tripped by a stud on the measuring disk, the link 130 does not interfere with the return of the stop lever to its stop position shown in Fig. 8, but when the control lever has been thereafter raised to rock the shaft 80 to release the clutches and to withdraw the link 130 the end of the link connected with the tripping link 132 drops and the tripping link turns until it comes in line again with the link 130, the links being thus returned to the position shown in Fig. 8 ready to throw the stop lever when the control lever is again depressed. In order that the winding mechanism may be stopped at any time before the predetermined length of tapes has been wound, a connection is provided whereby if the control lever is raised when the control devices are in the running position shown in Fig. 9, the movement of the link 130 will trip the locking lever to release the stop lever and permit it to move to its stop position. The connection between the link 130 and the locking lever should be such as not to interfere with the movement of the locking lever when the same is automatically tripped. As shown, such connection is provided by a link 135 extending between the end of the link 130 and the locking lever and having a pin and slot connection at one end.

The operation of the machine will be generally understood from the foregoing description, but may be further briefly described as follows: Assuming that in the course of winding a series of alternate tapes from a portion of the winding drum on to flanged spools on the spindle a winding operation has been completed, the winding mechanism stopped and the winding spindle moved to its forward lower position with spools against the brush 52 as shown in Fig. 5 and by dotted lines in Fig. 6; the pick-up bar 90 is then moved downward to the lowest position shown by dotted lines in Fig. 6 in which its pick-up fingers rest on the adhesive side of the tapes on the table 58. The knife 56 is then lowered to cut off the tapes between the winding spindle and the feed roll, and the spindle may be given a partial rotation to cause the loose ends of the tapes to be applied to the rolls of tape on the spindle by the brush 51. The spindle with its rolls of tape thereon is then lifted from the machine, and the carrying arms 48 and 49 are swung up and back to the position shown by full lines in Fig. 6, and another spindle having empty spools thereon is placed in position. The pick-up bar is then lifted to raise the ends of the tapes from the table 58 and bring them against the cores of the spools on the spindle, and while in the intermediate position shown by dotted lines in Fig. 6 the pick-up bar is turned to apply the ends of the tapes to the cores of the spools, and then the pick-up bar is moved on up to its normal out of the way position shown by full lines in Fig. 6. The machine is then ready to be started again by the depression of the control lever 81.

Downward movement of the control lever by rocking the shaft 80 first throws the stop lever against the tension of its spring into running position as shown in Fig. 4 thereby releasing the feeding cylinder and loosening the brake band on the supply drum, and the stop lever is automatically locked against return movement by the locking lever 112. Further downward movement of the control lever first gives a slight further movement to the stop lever to lift the link 130 and break the connection between the shaft 80 and the stop lever, and then causes the driving clutches to be brought into operation to cause the feeding cylinder and the winding spindle to rotate. The feeding cylinder draws the tapes from the supply roll at an approximately constant speed, and by the rotation of the spindle the tapes are stripped from the feeding cylinder and wound into rolls under a tension which is dependent upon the pressure applied to the disk of the clutch 64.

The relative adjustment of the springs 87 on the clutch operating rods 83 and 84 and of the bearing pins 71 and 78 should be such that a driving force will be given to the spindle as soon as or a little before the feeding cylinder begins to rotate to cause the spindle to take up any slack which there may be in the tapes between it and the feeding cylinder and thereafter to strip the tapes from the cylinder as fast as they are advanced thereby; and such that the feeding cylinder will gradually but quite quickly attain its normal running speed and thereafter maintain the same during the winding operation, the clutch 75 driving the feed roll practically without slip, and the clutch 64 providing a friction drive for the winding spindle whereby the tapes will be wound under a tension depending upon the pressure applied to the clutch, the speed of rotation of the spindle gradually decreasing as the size of the rolls of the tape wound thereon increases. Further downward movement of the control lever, or increased pressure thereon, will increase the pressure applied to the clutch 64 and increase the tension under which the tapes are wound. Such further movement of the control lever will also increase the pressure on the feeding cylinder clutch 75, but this will not otherwise affect the operation of the winding mechanism since the feeding cylinder is normally driven without slip of its clutch. Similarly a slight lifting of the control lever will decrease the tension under which the tapes are wound.

It may be noted that a greater pull or tension on the tapes is required to strip the tapes from the supply drum than is required to strip them from the feeding cylinder. The springs on the clutch operating rods must of course be of suitable relative strength and length so that by adjustment of the nuts 85 the desired control of the clutches may be secured. In the machine shown springs of approximately equal strength and length have been used with good results. In order to avoid excessive speeding-up of the spindle with increased slip of the spindle driving clutch, the spindle gearing is advantageously timed so that when the spindle is rotating at its maximum speed relatively to the feeding cylinder the surface of the cores of the spools carried by the spindle is slightly less than the maximum surface speed of the cylinder. This does not interfere with the proper taking-up of the tapes by the spindle when the feeding cylinder is driven through a slip clutch, since at the start of each winding operation the feeding cylinder does not attain its normal speed instantly, and by the time it does reach its normal speed the size of the rolls of tape on the spindle has increased so that the maximum surface speed thereof is in excess of the surface speed of the feeding cylinder.

As the feeding cylinder commences the last rotation of the number of rotations required to feed the desired length of tapes, the locking lever 112 is tripped by a stud 124 on the measuring disk 120 and the stop lever moves into stop position, tightening the brake band on the supply drum and bringing its stop arm 101 into the path of the stop pin 102 so as to stop the feeding cylinder when it has completed its last rotation. The operation of the winding mechanism is thus stopped and the operator by throwing the control lever upward then throws out the clutches and returns the link 130 and tripping link 132 to operative position. When the feeding cylinder stops the spindle also stops under tension of the tapes. The slight continued rotation of the feeding cylinder after the tripping of the locking lever 112 causes a slight further movement of the measuring disk sufficient to carry the stud 124 by which the locking lever has been tripped from the position where it struck the end of the locking lever, as indicated by dotted lines in Fig. 9, to the position just beyond the end of the locking lever as shown in Figs. 4 and 9 where it will not interfere with movement of the locking lever to locking position. After the winding mechanism has come to rest, the winding spindle is again moved forward to the position shown in Fig. 5 and by dotted lines in Fig. 6, and the tapes are cut and the spindle removed from the machine to permit a new spindle to be inserted and the winding operation to be repeated. After the whole length of a set of the tapes has been stripped from the supply roll and wound into small rolls by the winding mechanism, the supply drum will be shifted to bring other alternate tapes thereon into position to be threaded through the winding mechanism; and after these tapes have been taken from the supply drum, the drum will be shifted to bring another portion thereof into position to supply tapes to the winding mechanism, and this shifting and positioning of the supply drum may be continued until all the tapes have been taken therefrom.

In starting to wind a series of tapes from the supply drum, it is desirable that the ends of the tapes be threaded through the winding mechanism in proper alinement and so that the several tapes shall leave the supply drum at points approximately in line longitudinally of the drum. Owing to the adhesive character of the tape, this threading through the winding mechanism properly is a matter of some difficulty, and although the threading may be accomplished in other ways, it is most advantageously effected in the following manner, as illustrated by the diagrammatic views in Figs. 10 to 14 inclusive. To prepare for threading a series of tapes through the winding mechanism, the ends of the several tapes, which are wound on the supply drum adhesive side in, are first folded back on a fold line extending longitudinally of the drum as represented at $b$ in Fig. 10 so that a short length at the end of each tape will present its adhesive side outermost. The guide roll 30 is then moved backward and pressed against the turned back ends of the tapes, the drum being turned to bring these ends into suitable position to be engaged by the roll. The roll is then given a partial rotation in the direction of the arrow in Fig. 10 so that the tapes shall be securely held by the roll and the roll is moved away from the drum and the drum turned a short distance upward to strip a short length of the tapes from the drum as indicated in Fig. 11. The roll is then turned in the opposite direction, or as indicated by the arrow in Fig. 11, to strip the tapes from the roll and hold them back with their uncoated side against the roll except for short turned back ends as shown in Fig. 12. The roll 30 is then moved further forward to press the edge of the fold of the tapes against the feeding and measuring cylinder 25 as shown in Fig. 12, and the guide roll and the feeding cylinder are then turned by hand in opposite direction as indicated by the arrows in Figs. 12 and 13 until the ends of the tapes have been unfolded and the adhesive sides of the extreme ends of the tapes transferred from the guide roll to the feeding roll. The feeding roll is then turned in its running direction as indicated by the arrow in Fig. 14 to carry the ends of the tapes around the roll to its front side from which they may be stripped by hand and after the roll has been turned slightly farther laid over the table 58 and over the edge of the knife 55. The tapes are then in position to have their ends cut off even by the knife 56 and thereafter to be lifted and applied to the winding spindle as before described. It will be noted that this method of threading the tapes through the winding mechanism insures the proper alinement of the tapes on the feeding cylinder and that the points at which the several tapes leave the supply drum will be approximately in line longitudinally of the drum.

It may be pointed out here that in the operation of winding the tapes on the winding spindle the tension under which the tapes are wound is wholly independent of the tension under which the tapes are stripped from the supply drum by the feeding cylinder. Not only does this permit of desired adjustment and control of the winding tension without regard to the tension under which the tapes are pulled from the supply drum, which is sometimes greater than the desired winding tension on account of the adhesion between the successive layers of tape on the drum, but if there should be a difference in lengths of the several tapes between the guide roll and the supply drum the difference in tension under which the tapes are drawn from the supply drum resulting from the different angles at which the tapes are stripped from the supply drum due to such difference in length of tape between the guide roll and the supply drum would have no effect on the tension under which the tapes are wound on the spindle. It should also be noted that by reason of the fact that the tapes are drawn by the winding spindle directly from the surface of the feeding cylinder and the point at which each tape leaves the surface of the cylinder is determined by the tension or pull thereon, the tension under which each tape is wound is independent of the tension under which the other tapes are wound, and any slight difference in tension of the tapes when attached to the winding spindle, such as a slight relative slackness in any of the tapes, or any such difference which might develop during the winding, will be automatically taken up and adjusted by a relative change in the points at which the tapes leave the feeding cylinder. This would of course not be the case if the several tapes were pulled by the winding spindle from a definitely fixed line.

If a length of tape being wound should contain an imperfect or faulty portion, it is desirable that the winding be stopped and such portion of the tape or tapes cut out, and if this is done it is necessary in order that the wound rolls shall contain the full measure of tape that an additional length of tape be fed equal to the length cut out. The angular adjustability of the feeding cylinder on its shaft enables this to be readily accomplished. Suppose the machine to have been stopped after such a faulty portion of tape has been noticed passing through the winding mechanism and after the faulty portion has been wound on the spindle; the spindle will be lowered and the tapes severed and the faulty portions will be drawn off by hand from the rolls on the spindle and cut off. The feeding cylinder is then disconnected from its shaft by loosening the set screw 29 and sliding the collar 27 out of engagement with the end of the cylinder. The shaft is then turned backward an amount equal to a forward rotation which would feed a length of tape equal to the length cut off and the collar 27 is then moved back and again secured in its holding position to fasten the cylinder to the shaft. This backward turning of the shaft without turning the cylinder gives a backward movement to the measuring disk sufficient to cause an additional length of tape to be fed equal to the length of tape cut out. The spindle with its partly wound rolls of tape is then returned to the winding position and the ends of the tape are lifted from the table 58 by operation of the pick-up bar and applied to the partly wound rolls on the spindle and the winding is then continued.

It is sometimes desirable to wind the tapes with a strip of uncoated cloth or other suitable material wound with the tape to lie between the layers of tape in the roll and to adhere to the coated side of the tape to form a protective covering therefor when the tape is unwound. The tapes so covered are usually comparatively wide tapes. Figs. 15 to 19 illustrate a way of adapting the machine shown to the winding of a covering strip with the tape in a roll wound directly on the winding spindle without using any core provided by a flanged spool or otherwise. Such adaptation of the machine to the winding of a covering strip with the tape involves the use of a split winding spindle 40ª and the provision of means for guiding the covering strip to the spindle. Such guiding means as shown guides the covering strip to the spindle from a point between the feeding cylinder 25 and the cutting edge 55, the spindle being in the lower forward position. The covering strip or strips c, which may be led to the machine from a suitably supported supply roll not shown, and which may be somewhat wider than the tape if desired, passes about guide rolls 140 and 141 and thence downwardly and beneath a vertically movable floating guide roll 142 from which it passes forward to join the adhesive tape at the winding spindle. The guide rolls are mounted in standards which may be removably mounted on the uprights 21 and 22, one of such standards, 143, being shown in Figs. 15, 16 and 17, the floating guide roll 142 having its spindle ends extending into vertical slots in the standards to permit it to move vertically between an upper or winding position as shown in Fig. 16 to which it is raised and in which it is held by the tension of the covering strip, and a lower position as shown in Figs. 15 and 17 in which it rests on the covering strip and adhesive tape and serves to hold the ends of the strip and tape in position on the table 58 as shown in Fig. 15 after wound portions of the strip and tape have been cut off. The split spindle 40ª is provided at one end with a solid end portion 44ª formed to rest and turn in the open bearing 45 carried by the arm 48 and with a circumferential groove for receiving the edge of the positioning plate 46, and also with a finger disk 51ª. The spindle is split clear to its other end, and for receiving and supporting this split end of the spindle and for rotating the spindle by connection with this split end, a socket-piece 145 is provided secured to the end of the spindle shaft 47 by means of a stud which extends into the central recess in the end of the shaft and is formed with a threaded end to screw into a threaded portion of the recess to secure the socket-piece to the shaft. The socket-piece is formed with a central socket of a size to receive the split end of the spindle and which is provided with a cross piece 146 to extend into the space between the separated portions of the ends of the spindle.

To wind a tape with a covering strip, and assuming first that a single tape of considerable width is to be wound with a covering strip of the same width, the tape having been threaded through the winding mechanism and the covering strip c having been threaded between the guide rolls 140 and 141 and downward beneath, and forward from the floating guide roll 142, and the ends of the tape and covering strip lying over the table 58 having been cut off even between the knife edges 55 and 56, then preparatory to winding the ends of the tape and covering strip are first attached to the spindle by inserting the ends in the slot or opening of the spindle and then turning the spindle to wrap the material about the same. For convenience in getting the ends of the tape and covering strips into the slot of the spindle, the table 58 is formed with a recess or depression 147 extending parallel with the knife edge 55 and of a width and depth corresponding substantially to the width and thickness of one part or side of the split spindle so that when the ends of the tape and covering strip are lying on the table over the recess therein the spindle may be brought into the desired relation with the ends of the tape and covering strip by moving it endwise with one side in the recess in the table beneath the material and the other side over the material. Having been so brought in the desired relationship with the ends of the tape and covering strip, and the control lever having been moved to release the feeding cylinder and the supply drum, the spindle is turned to wrap the ends of the tape and measuring strip about the spindle sufficiently to hold them securely thereto and is then lifted and carried forward and placed in winding position with its split end inserted in the socket-piece 145. The control lever being then given a further movement to bring the driving clutches into operation, the feeding cylinder and the spindle will be driven as in the operation before described and the tape and covering strip will be wound on the spindle. During the winding, the tension on the covering strip will cause the floating guide roll 142 to be lifted to the position shown in Fig. 16 so that the covering strip will not come into contact with the tape which is being wound adhesive side up until the tape and strip come together at the winding point, thus avoiding any fullness of the covering strip in the wound roll which might result if the tape and strip were brought together before reaching the spindle. The winding operation will continue until, when the desired length of tape has been wound, the winding mechanism is automatically stopped as before described, after which the wound tape and covering strip may be cut off from the webs by operating the knife 56.

It is considered desirable when a covering strip is wound with the adhesive tape that the outer end of the covering strip shall extend somewhat beyond the end of the tape. This result may be secured with the mechanism shown by pulling forward a little additional length of the covering strip after the winding operation has ceased and before the tape and strip are cut off so as to form a loop or loose bend in the covering strip between the knife edge and the wound roll as indicated in Fig. 17. The strip may be so pulled forward by the operator taking hold of the strip with his fingers or any suitable instrument, and after the strip has been pulled forward and before the knife is operated, the strip is released to allow the portion over the table to move back slightly to permit the floating guide roll 142 to drop into the position shown in Figs. 17 and 15, in which position it serves to hold the ends of the tape and covering strip in position on the table during and subsequent to the cutting. After a loop has been formed in the tape as indicated in Fig. 17, then when the loose ends are laid on to the roll on the spindle, the end of the covering strip will extend as desired beyond the end of the tape. When the spindle with its wound roll thereon has been removed from the winding mechanism it will be free to be pulled out from the roll of tape and covering strip since the adhesive side of the tape has not been allowed to come into contact with the spindle.

While it has been assumed for convenience in the above description of operation that a single wide tape with a covering strip of corresponding width was being wound, it is obvious that a plurality of tapes may be wound at a single operation in the same manner, a covering strip of corresponding width being wound with each tape.

It is to be understood that the invention so far as it relates to the apparatus is not to be limited to the exact construction, arrangement and combination of parts shown and to which the foregoing description has been largely confined, but that it includes changes and modifications thereof within the claims; and that the method forming part of the invention is not limited to the use of any particular apparatus but may be carried out with the aid of any apparatus adapted for such purpose.

What is claimed is:

1. The method of producing rolls of adhesive tape, which consists in producing a relatively wide web of the adhesive material wound on a supply drum, cutting the web wound on the supply drum circumferentially into a plurality of tapes of equal width, unwinding a plurality of alternate tapes from the supply drum simultaneously and winding the same on a winding spindle, and thereafter unwinding other alternate tapes from the supply drum and winding the same on the winding spindle.

2. The method of producing rolls of adhesive tape, which consists in drawing the tape from a supply roll and applying it as it is withdrawn from the supply roll to a rotating cylinder to the surface of which the adhesive side of the tape adheres, and leading the tape from said cylinder to a winding spindle by the rotation of which the tape is stripped from the cylinder and wound on the spindle, whereby the tape is wound on the spindle under a tension which is independent of the tension under which the tape is drawn from the supply roll.

3. The method of producing rolls of adhesive tape, which consists in drawing the tape from a supply roll by means of a feeding cylinder to the surface of which the adhesive side of the tape adheres, and leading the tape from the feeding cylinder to a winding spindle by the rotation of which the tape is stripped from the cylinder and wound on the spindle, whereby the tape is wound on the spindle under a tension which is independent of the tension under which the tape is drawn from the supply roll.

4. The method of producing rolls of adhesive tape, which consists in simultaneously drawing a plurality of tapes from a supply roll and applying them as they are withdrawn from the supply roll to a rotating cylinder to the surface of which the adhesive side of the tapes adheres, and leading the tapes from said cylinder to a winding spindle by the rotation of which the tapes are stripped from the cylinder and wound on the spindle, whereby each tape is wound on the spindle under a tension which is independent of the tension under which the tapes are drawn from the supply roll and independent of the tension under which the other tape or tapes are wound on the spindle.

5. The method of producing rolls of adhesive tape, which consists in simultaneously drawing a plurality of tapes from a supply roll by means of a feed cylinder to which the adhesive side of the tape adheres, and leading the tapes from said cylinder to a winding spindle by the rotation of which the tapes are stripped from the cylinder and wound on the spindle, whereby each tape is wound on the spindle under a tension which is independent of the tension under which the tapes are drawn from the supply roll and independent of the tension under which the other tape or tapes are wound on the spindle.

6. A winding machine for producing rolls of adhesive tape, comprising means for simultaneously drawing a plurality of tapes from a supply drum, and winding means for winding each tape into a roll as it is drawn from the supply drum and under a tension which is independent of the tension under which the tapes are drawn from the supply drum and independent of the tension under which the other tape or tapes are wound into rolls.

7. A winding machine for producing rolls of adhesive tape, comprising feeding means for drawing the adhesive tape from a supply roll and including a member having a surface to which the tape adheres, winding means for stripping the tape from said member of the feeding means and for winding it into a roll under a tension which is independent of the tension under which the tape is drawn from the supply roll, and driving means for the winding means adapted to drive the winding means at a speed controlled by the adhesion of the tape to said member of the feeding means.

8. A winding machine comprising means for simultaneously drawing a plurality of strips of the material to be wound from a supply drum, and winding means for winding each strip into a roll as it is drawn from the drum and under a tension which is independent of the tension under which the strips are drawn from the drum and independent of the tension under which the other strip or strips are wound into rolls.

9. A winding machine for producing rolls of adhesive tape, comprising a support for a supply drum, a feeding cylinder for drawing the tape from the supply drum and which has a surface to which the tape will adhere, driven winding means for stripping the tape from said feeding cylinder and winding it into a roll, and driving means for the winding means adapted to drive the winding means at a speed controlled by the adhesion of the tape to the feeding cylinder.

10. A winding machine for producing rolls of adhesive tape, comprising a support for a supply drum having a plurality of adhesive tapes wound thereon, a feed roll having a surface to which the tapes adhere and by which a plurality of tapes are simultaneously drawn from the supply drum, and a winding spindle by which the tapes are stripped from the feed roll and wound into rolls.

11. A winding machine for producing rolls of adhesive tape, comprising a support for a supply drum, a feed roll having a surface to which the tape adheres and by which the tape is drawn from the supply drum, winding means for stripping the tape from the feed roll and winding it into rolls, means for rotating the feed roll, and means controlled according to the rotation of the feed roll for automatically interrupting the rotation thereof after it has made a predetermined movement.

12. A winding machine for producing rolls of adhesive tape, comprising a support for a supply drum, a feed roll having a surface to which the tape adheres and by which the tape is drawn from the supply drum, means for stripping the tape from the feed roll and winding it into rolls, means for rotating the feed roll, and means controlled according to the rotation of the feed roll for automatically interrupting the rotation thereof and for braking the supply drum.

13. A winding machine for producing rolls of adhesive tape, comprising a support for a supply drum, a brake for the supply drum, a feed roll having a surface to which the tape adheres and by which the tape is drawn from the supply drum, means for stripping the tape from the feed roll and winding it into rolls, means for rotating the feed roll, and automatic stop mechanism operating to bring the supply drum brake into operation and to thereafter stop the rotation of the feed roll after a predetermined number of rotations thereof.

14. A winding machine for producing rolls of adhesive tape, comprising a support for a supply drum, a feed roll having a surface to which the tape adheres and by which the tape is drawn from the supply drum, means for stripping the tape from the feed roll and winding it into rolls, a member given a slow movement in predetermined ratio to the rotation of the feed roll, and a brake for the supply drum and a stop for the feed roll controlled by the movement of said member.

15. A winding machine for producing rolls of adhesive tape, comprising a support for a supply drum having a plurality of adhesive tapes wound thereon, a feed roll having a surface to which the tapes adhere and by which a plurality of tapes are simultaneously drawn from the supply drum, a winding spindle by which the tapes are stripped from the feed roll and wound into rolls, a slip driving device through which the winding spindle is driven, and automatic stop mechanism for stopping the feed roll after a predetermined rotation thereof.

16. A winding machine for producing rolls of adhesive tape, comprising a support for a supply drum, a feed roll having a surface to which the tape adheres and by which the tape is drawn from the supply drum, a winding spindle by which the tape is stripped from the feed roll and wound in rolls, a friction clutch through which the feed roll is driven, a friction clutch through which the winding spindle is driven, controlling means for putting said clutches into operation to drive the feed roll and the winding spindle, automatic stop mechanism for stopping the feed roll at the end of a predetermined number of rotations thereof, and means for stopping the rotation of the feed roll at will before the end of such predetermined number of rotations.

17. A winding machine for producing rolls of adhesive tape, comprising a support for a supply drum, a feed roll having a surface to which the tape adheres and by which the tape is drawn from the supply drum, a winding spindle by which the tape is stripped from the feed roll and wound into a roll, means for driving the feed roll, a friction clutch through which the winding spindle is driven, means for controlling the clutch at will to vary the winding tension, and automatic stop mechanism for stopping the winding operation when a predetermined length of tape has been wound.

18. A winding machine, comprising a support for a supply roll, a winding mechanism for drawing material from the supply roll and winding it into rolls, means for frictionally driving the winding mechanism, a brake for the supply drum, a stop member operable to cause the operation of the winding mechanism to be stopped and the supply drum brake to be operated, means for moving said member to release the winding mechanism and the supply drum, a locking lever for holding the stop member in non-operative position, a member which is given a slow movement during the operation of the winding mechanism and by which the locking lever is tripped after a predetermined operation of the winding mechanism to release the stop member and permit it to move to operative position.

19. A winding machine comprising a support for a supply drum, winding mechanism for drawing material from the supply drum and winding it into rolls, means for frictionally driving the winding mechanism, a brake for the supply drum, a stop lever operable to cause the operation of the winding mechanism to be stopped and the supply drum brake to be operated, a spring tending to move the stop lever into operative position, means for moving the stop lever against the tension of said spring to release the winding mechanism and the supply drum, locking means for holding the stop lever in non-operative position, and means for automatically releasing the stop lever to permit it to move into operative position in time to stop the operation of the machine after a predetermined movement of the winding mechanism.

20. A winding machine, comprising a support for a supply drum, winding mechanism for drawing material from the supply drum and winding it into rolls, means for frictionally driving the winding mechanism, a brake for the supply drum, a stop lever operable to cause the winding mechanism to be stopped and the supply drum brake to be operated, a spring tending to move the stop lever into operative position, means for moving the stop lever against the tension of said spring to release the winding mechanism and the supply drum, a locking lever for holding the stop lever in non-operative position, and a member which is given a slow rotary movement at a predetermined speed ratio to the rate of feed and winding of the material and whereby the locking lever is tripped to release the stop lever after a predetermined movement of said member.

21. A winding machine, comprising a support for a supply drum, winding mechanism for drawing material from the supply drum and winding it into rolls, means for causing a relative longitudinal adjustment between the supply drum and the winding mechanism, a brake for the supply drum, a stop member and connections whereby the winding mechanism is automatically stopped after a predetermined operation thereof, and connections between said stop member and the supply drum brake for operating the brake when the stop member moves to stop the winding mechanism, said connections including a shaft extending longitudinally of the supply drum and a member mounted to turn with said shaft but free to slide thereon.

22. A winding machine, comprising a support for a supply drum, winding mechanism for drawing material from the supply drum and winding it into rolls, friction driving mechanism for driving the winding mechanism, a brake for the supply drum, a stop lever operable to cause the operation of the winding mechanism to be stopped and the supply drum brake to be operated, a spring tending to move the stop lever into operative position, a control lever for controlling said friction driving mechanism, a connection between said control lever and the stop lever whereby when the control lever is moved to start a winding operation the stop lever is moved against the tension of its spring to release the winding mechanism and the drum, means for automatically disconnecting the control lever from the stop lever after the stop lever has been moved to non-operative position, locking means for holding the stop lever in non-operative position, and means for automatically releasing the stop lever to permit it to move to operative position to stop the winding mechanism after a predetermined operation thereof.

23. A winding machine, comprising in combination with a feed roll and a winding spindle, a friction clutch for driving the feed roll, a friction clutch for driving the winding spindle, a control lever, connections between the control lever and each of said clutches, a stop member by movement of which into operative position a stop is moved into position to stop the rotation of the feed roll, a connection between the control lever and said stop member whereby the stop member is moved to release the feed roll during the first part of the starting movement of the control lever, means whereby after the stop member has been moved to non-operative position the control lever is disconnected from the stop member to permit free movement of the control lever during its further movement for operating said clutches, and means for moving the stop member automatically into operative position to stop the rotation of the feed roll after a predetermined rotation thereof.

24. A winding machine, comprising a feed roll, a winding spindle for winding material fed by the feed roll, differential driving mechanism for the feed roll and the winding spindle, automatic stop mechanism operating after a predetermined operation of the feed roll, said stop mechanism including a member which is moved at a rate which bears a predetermined ratio to the rate of rotation of the feed roll and by which the time of operation of the stop mechanism is determined, and means for producing a relative angular adjustment between said member and the feed roll whereby the length of material fed and wound for a given complete operation may be increased.

25. A winding machine comprising a feed roll, a winding spindle, differential driving mechanism for the feed roll and the winding spindle, automatic stop mechanism operating after a predetermined operation of the feed roll, said stop mechanism including a rotary member which is driven from the feed roll shaft at a rate which bears a predetermined ratio to the rate of rotation of the feed roll shaft, and means for adjusting the feed roll shaft angularly relatively to the feed roll.

26. A winding machine for producing rolls of adhesive tape, comprising a support for a supply drum, a feed roll having a surface to which the tape adheres and by which the tape is drawn from the supply drum, means for stripping the tape from the feed roll and winding it into rolls, and a guide roll over which the tape passes from the supply drum to the feed roll which guide roll is movable between a position closely adjacent the feed roll and a position closely adjacent the supply drum.

27. A winding machine for producing rolls of adhesive tape, comprising a support for a supply drum, a feed roll having a surface to which the tapes adhere and by which the tapes are drawn from the supply drum, a winding spindle by which the tapes are stripped from the feed roll and wound into rolls, a guide roll over which the tapes pass from the supply drum to the feed roll and which is movable between a position closely adjacent the feed roll and a position closely adjacent the supply drum, and means for simultaneously applying to the winding spindle the ends of a plurality of tapes extending from the feed roll.

28. A winding machine for producing rolls of adhesive tape, comprising a feed roll having a surface to which the tapes adhere, a winding spindle by which the tapes are stripped from the feed roll and wound into rolls, severing means for cutting off wound portions of the tapes, a support for supporting the ends of the tapes extending from the feed roll after wound portions thereof have been cut off, and supporting means for the winding spindle formed to permit the spindle to be moved from a position beyond the severing line and said support to a position between the severing line and the feed roll.

29. A winding machine for producing rolls of adhesive tape, comprising a feed roll having a surface to which the tapes adhere, a winding spindle by which the tapes are stripped from the feed roll and wound into rolls, severing means for cutting off wound portions of the tapes, a support for supporting the ends of the tapes extending from the feed roll after wound portions thereof have been cut off, the winding spindle being movable from a position beyond the severing line and said support to a position between the severing line and the feed roll, and tape lifting and applying means for lifting the tapes from said support and applying them to the winding spindle.

30. A winding machine for producing rolls of adhesive tape, comprising tape feeding means, a winding spindle, severing means for cutting off wound portions of tape, a support for supporting the end of the tape extending from the feeding means after a wound portion thereof has been cut off, the winding spindle being movable from a position beyond the severing line and said support to a position between the severing line and the feeding means, and a lifting and applying member formed to engage the adhesive side of the end of the tape as it lies on said support and movable to lift the end of the tape and apply it to the winding spindle.

31. A winding machine for producing rolls of adhesive tape, comprising feeding means for simultaneously feeding a plurality of tapes, a winding spindle by which the tapes are wound into rolls, severing means for cutting off wound portions of the tapes, a support for supporting the ends of the tapes extending from the feeding means after wound portions thereof have been cut off, the winding spindle being movable from a position beyond the severing line and said support to a position between the severing line and the feeding means, and a pick-up bar having a plurality of spring fingers extending substantially concentrically with and part way around the bar, said bar being movable to bring the pick-up fingers into engagement with the adhesive side of the tapes lying on said support and to lift the tapes from the support to the spindle and being rotatable for applying the ends of the tapes to the spindle.

32. A winding machine for producing rolls of adhesive tape, comprising feeding means for simultaneously feeding a plurality of tapes, a winding spindle adapted to carry a plurality of flanged spools, severing means for cutting off wound portions of the tapes, a support for supporting the ends of the tapes extending from the feeding means after wound portions thereof have been cut off, the winding spindle being movable from a position beyond the severing line and said support to a position between the severing line and the feeding means, and a pick-up bar having a plurality of spaced spring fingers extending substantially concentrically with and part way around the bar, said bar being movable to bring the pick-up fingers into engagement with the adhesive side of the tapes lying on said support and to lift the tapes from the support to the spindle and being rotatable for applying the ends of the tapes to the cores of the spools on the spindle.

33. A winding machine for producing rolls of adhesive tape, comprising means for simultaneously feeding a plurality of tapes, a winding spindle by which the tapes are wound into rolls, severing means for cutting off wound portions of the tapes, a support for supporting the ends of the tapes extending from the feed roll after wound portions thereof have been cut off, and a pick-up bar having a plurality of yielding fingers and movable to bring said yielding pick-up fingers into engagement with the adhesive side of tapes lying on said support and to carry said tapes to the winding spindle and being rotatable for applying the ends of the tapes to the spindle.

34. A winding machine for producing rolls of adhesive tape, comprising feeding means for simultaneously feeding a plurality of tapes, a winding spindle by which the tapes are wound into rolls, severing means for cutting off wound portions of the tapes, and applying means for engaging the adhesive side of the ends of the tapes extending from the feed roll after wound portions thereof have been cut off and movable for carrying the ends of the tapes to the winding spindle and for applying the tapes to the winding spindle.

In testimony whereof I have hereunto set my hand in the presence of two subscribing witnesses.

WILLIAM F. CODRINGTON.

Witnesses:
  A. L. KENT,
  PAUL H. FRANKE.